Aug. 24, 1937.  J. P. DENNEBAUM  2,091,195
GUARD STRUCTURE
Filed May 8, 1936   2 Sheets-Sheet 1
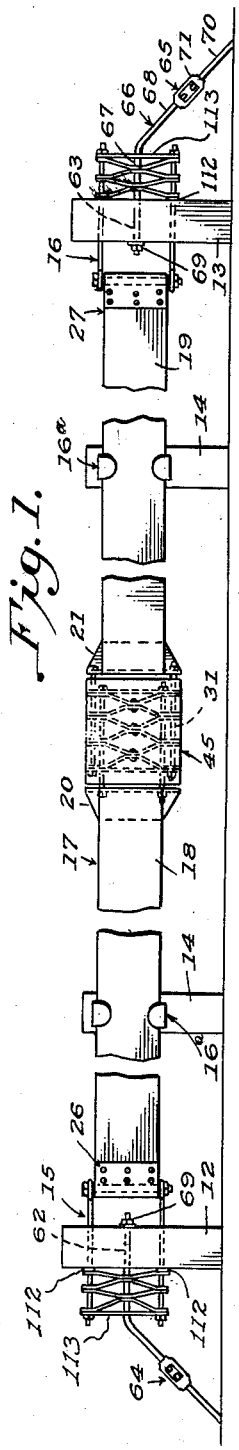
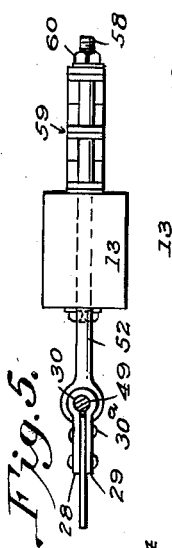
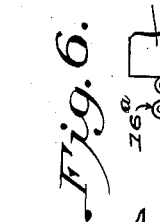
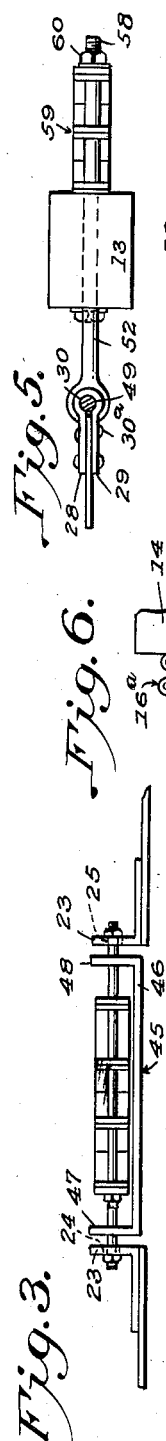
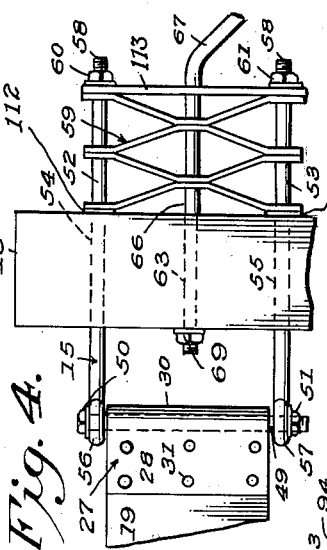
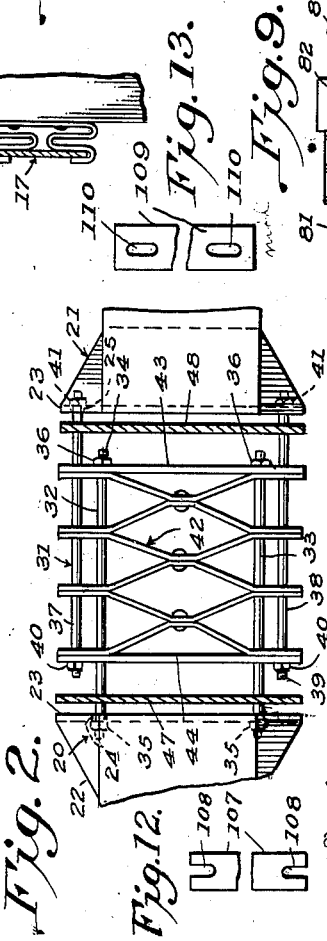
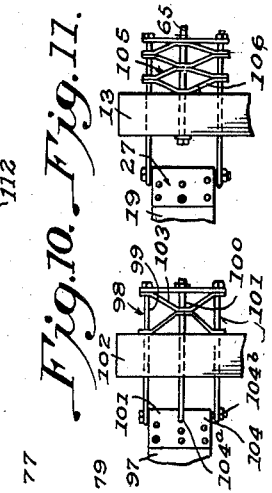
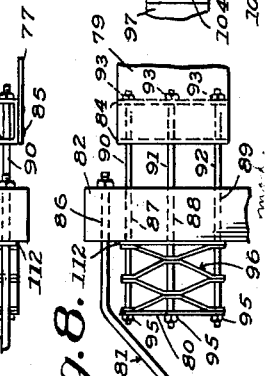
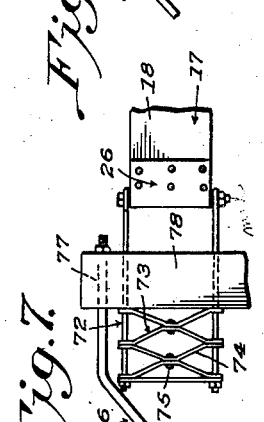
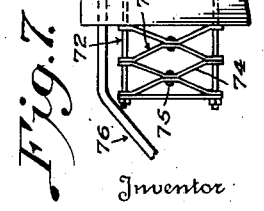
Inventor
JOHN P. DENNEBAUM
By Kimmel & Crowell
Attorneys Aug. 24, 1937.  J. P. DENNEBAUM  2,091,195
GUARD STRUCTURE
Filed May 8, 1936  2 Sheets-Sheet 2
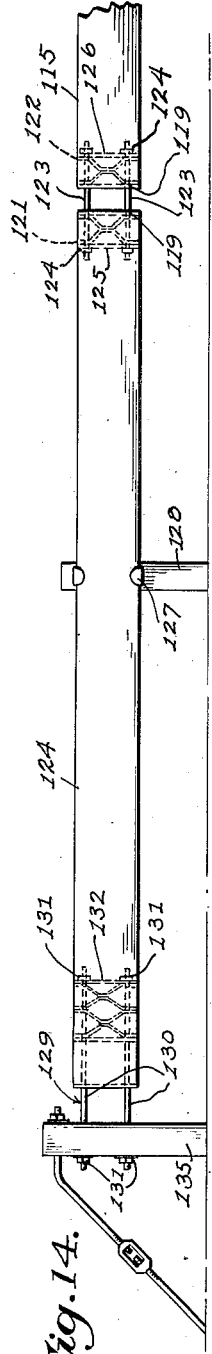
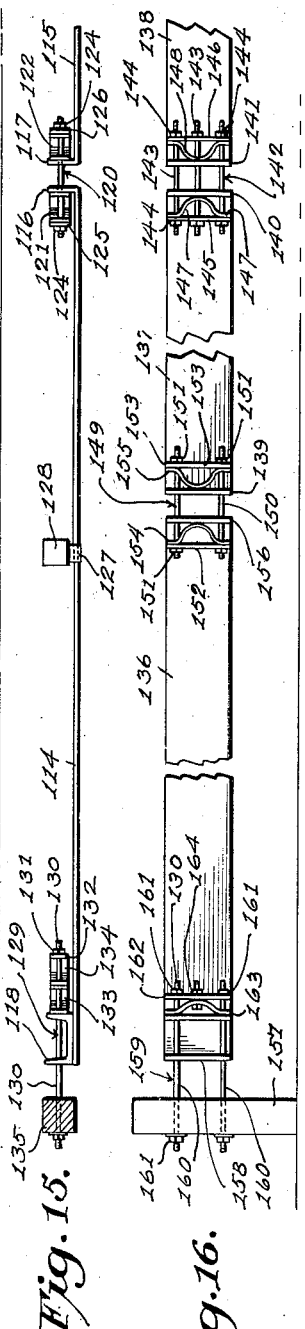
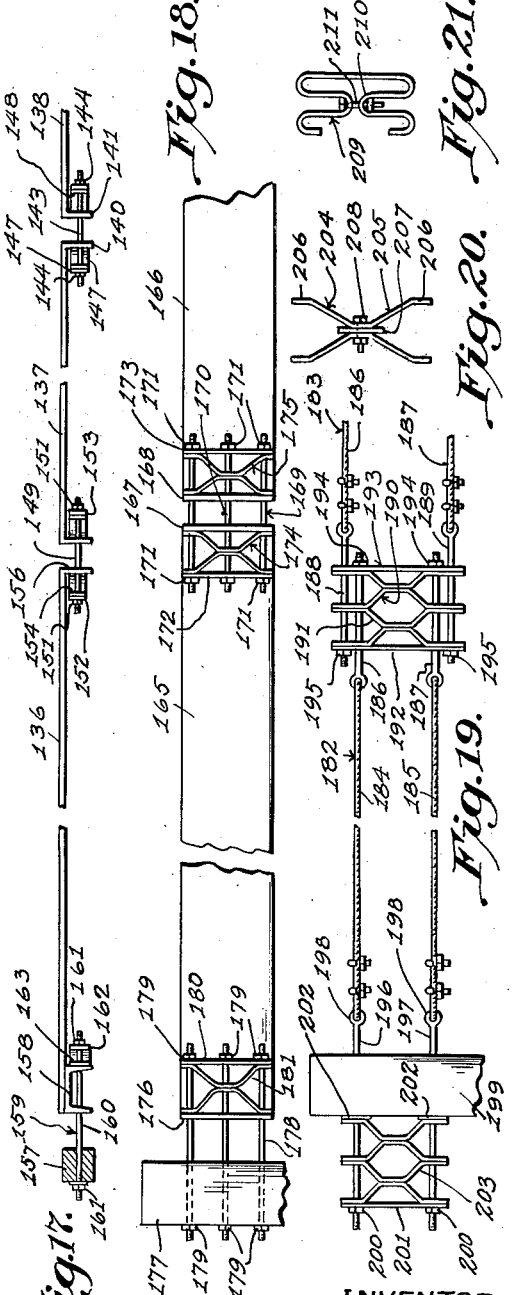
INVENTOR
John P. Dennebaum
By Kimmel & Crowell
ATTORNEYS Patented Aug. 24, 1937

2,091,195

UNITED STATES PATENT OFFICE 2,091,195

GUARD STRUCTURE

John P. Dennebaum, Scranton, Pa.

Application May 8, 1936, Serial No. 78,716

13 Claims. (Cl. 267—69)

This invention relates to a guard structure for protective purposes on highways and is designed primarily for positioning at the sides of a curve of a roadway; however, it is to be understood that a guard structure, in accordance with this invention, may be employed at any point in relation to the roadway or in any connection for which it may be found applicable.

The invention has for its object to provide, in a manner as hereinafter set forth, a guard device possessing shock absorbing and take-up characteristics and functioning to arrest a vehicle from passing off of a roadway sidewise more particularly when rounding curves thereby preventing accidents.

A further object of the invention is to provide, in a manner as hereinafter set forth, a guard structure including means for absorbing shocks as well as for reducing to a minimum damage or injury to a vehicle when the latter impacts the structure.

A further object of the invention is to provide, in a manner as hereinafter set forth, a guard structure including a resiliently suspended lengthwise extendible and contractible guard rail.

A further object of the invention is to provide, in a manner as hereinafter set forth, a guard structure for the purpose referred to including a resiliently suspended lengthwise extendible and contractible guard rail coupled at its ends with take-up elements of the cushion type.

A further object of the invention is to provide, in a manner as hereinafter set forth, a guard structure for the purpose referred to including a guard rail having means interposed therein to provide for the extending and contracting of the rail lengthwise thereof when impacted upon by a vehicle.

A further object of the invention is to provide, in a manner as hereinafter set forth, a guard structure for the purpose referred to including a guard rail formed of a pair of sections coupled together by an extensible and contractible central coupling device and with the outer ends of the sections being coupled with supporting posts by slidably mounted extendible and contractible outer coupling devices functioning as take-ups.

Further objects of the invention are to provide, in a manner as hereinafter set forth, a guard structure for the purpose referred to which is simple in its construction and arrangement, strong, durable, cushioned possessing a shock absorbing characteristic, thoroughly efficient in its use, conveniently assembled in guarding relation with respect to the side of a roadway, and comparatively inexpensive to manufacture.

With the foregoing and other objects which may hereinafter appear, the invention consists of the novel construction, combination and arrangement of parts as will be more specifically referred to and are as illustrated in the accompanying drawings wherein is shown several embodiments of the invention, but it is to be understood that changes, variations and modifications may be resorted to which fall within the scope of the invention as claimed.

In the drawings:

Figure 1 is a front elevation, broken away, of a guard structure in accordance with this invention, Figure 2 is an elevation partly in vertical section of the extendible and contractible central coupling device for the sections of a guard rail, Figure 3 is a top plan view of the central coupling device for the sections of the guard rail, Figure 4 is a fragmentary view in front elevation illustrating one end of the guard structure, Figure 5 is a top plan view of the end of the guard structure shown in Figure 4, Figure 6 is a fragmentary view in side elevation and in vertical section illustrating a form of guard rail suspension carried by a post and resiliently suspending and detachably clamping the guard rail to the post, Figure 7 is a fragmentary view in front elevation illustrating a modified form of outer coupling device for the guard rail, Figure 8 is a fragmentary view in front elevation illustrating still another modified form of outer coupling device for the guard rail, Figure 9 is a top plan view of the structure shown in Figure 8, Figure 10 is a fragmentary view in front elevation illustrating still another modified form of outer coupling device for the guard rail, Figure 11 is a fragmentary view in front elevation illustrating still another modified form of outer coupling device for the guard rail, Figure 12 is a side elevation illustrating the form of the end terminal portions of each of the resilient parts employed for the coupling devices, Figure 13 is a side elevation illustrating a modified form of the end terminal portions of each of the resilient parts employed for the coupling devices, Figures 14 and 15 are respectively a front elevation and a top plan view, both broken away, of still another modified form of the invention, Figures 16 and 17 are respectively a rear elevation and top plan view, both broken away, of still another modified form of the invention, Figure 18 is a rear elevation, broken away, of still another modified form of the invention, Figure 19 is a rear elevation, broken away, of still another modified form of the invention, Figure 20 is a front elevation of a modified form of resilient units for the take-up devices and coupling or cushioning elements, and Figure 21 is a side elevation of a modified form of suspension element for a guard rail section.

With reference to Figures 1 to 6 the guard structure is illustrated as including a pair of end posts 12, 13 and a plurality of intermediate posts 14 arranged in spaced relation and also spaced from the posts 12, 13. Preferably the intermediate posts will be of less height than the end posts. Slidably mounted in the posts 12, 13 is a pair of oppositely disposed outer coupling devices 15, 16 respectively. Secured to the front face of each of the intermediate posts 14 is a vertically disposed resilient suspension element 16a. The element 16a is of the form and arrangement corresponding to that shown in Patent 2,030,783. The element 16a functions to not only resiliently suspend the guard rail 17 but further acts to detachably clamp the guard rail 17 with the posts 14. The ends of the guard rail 17 are spaced from the posts 12, 13.

The guard rail 17 is formed of a pair of oppositely disposed sections 18, 19 each of which may be formed of a plurality of stretches suitably secured together or a single length of material and by way of example, the section 18, as well as the section 19 consists of a single length of material, which is to be of the desired length and of the desired contour in transverse cross section. The guard rail sections 18 and 19 have secured to the rear faces of the inner end terminal portions thereof a pair of oppositely disposed angle irons 20, 21 respectively. Each of said angle irons consists of a flared flange 22 and an oblong flange 23. The flanges 22 are secured to the rear faces of the end terminal portions of the guard rail sections, flush with the inner end edges of said sections and extended in opposite directions with respect to the side edges of said sections. The flanges 23 are disposed rearwardly and at right angles to the inner ends of the flanges 22. The flange 23 of the angle iron 20 is formed with a pair of superposed aligning openings 24. The flange 23 of the angle iron 21 is formed with a pair of aligning superposed openings 25. The openings 24 do not align with the openings 25 but are arranged inwardly with respect to said openings.

The guard rail sections 18, 19 have secured to their outer ends oppositely extending straps 26, 27 respectively. The straps are bent upon themselves as indicated at 28, 29 (Figure 5) to form a split loop or barrel 30. The ends of the sections 18, 19 extend into the bent straps and are fixedly secured therewith by the holdfast device 30a. The split loops or barrels are extended laterally from the outer end edges of the guard rail sections 18, 19. Arranged between the inner ends of the guard rail sections 18, 19 and slidably connected to the flanges 23 of the angle irons 20, 21 is a central or intermediate coupling device 31 for the guard rail sections. The device 31 not only functions to provide for the extension and contraction of the guard rail 17, but also to provide a cushioning shock absorbing means for the sections of guard rail 17. The device 31 includes a pair of parallel, superposed, combined supporting and guide bars 32, 33 which extend through the openings 24 in the flange 23 of the angle iron 20 and projects towards the angle iron 21. The ends of each of said bars 32, 33 are peripherally threaded as at 34. Mounted upon the threaded end portions of the bars 32, 33 are the abutment nuts 35, 36. The device 31 includes a pair of parallel, superposed, combined supporting and guide bars 37, 38 which extend through the openings 25 in the flange 23 of the angle iron 21 and project towards the angle iron 20. The ends of each of said bars 37, 38 are peripherally threaded as at 39. Mounted upon the threaded end portions of the bars 37, 38 are the abutment nuts 40, 41. The nuts 35 are arranged to abut the flange 23 of the angle iron 20. The nuts 41 are arranged to abut the flange 22 of the angle iron 21. A skeleton resilient cushioning and take-up element 42 is mounted on the bars 32, 33, 37 and 38. The nuts 36 abut the extender 43 of element 42. The nuts 40 abut the extender 44 of element 42. The said extenders are of strap-like form and also function as abutments for the resilient members of the element 42. The element 42 is arranged between the nuts 36 and the nuts 40 and is compressed by the bearing action of the nuts 36 and 40 on its ends when the guard rail sections 18, 19 are shifted in extended relation with respect to each other.

The device 31 includes a shield or protector for the front thereof and which is indicated at 45. The protector 45 also constitutes an abutment. The protector 45 consists of a plate 46 formed with a rearwardly extending pair of flanges 47, 48 disposed between the ends of element 42 and the flanges 23 of the angle irons. The flange 47 is slidably mounted on the bars 32, 33. The flange 48 is slidably mounted on the bars 37, 38. The element 45 extends above the bar 37 and depends below the bar 38. As the element 45 is slidably mounted it does not prevent in any manner the shifting of the guard rail sections towards and from each other.

The outer coupling devices 15, 16 are of like form. Each outer coupling device includes a pivot bolt 49 mounted in, extending above and depending below a barrel 30. The bolt 49 includes a head 50 and carries on its lower end a retaining nut 51. Each outer coupling device includes upper and lower bars 52, 53 which are slidably mounted in channels 54, 55 respectively, formed in an end post. The forward ends of the bars 52, 53 are provided with eyes or loops 56, 57 respectively. The eye 56 is mounted on the upper end of bolt 49 between the upper end of the barrel 30 and the nut 50. The eye 57 is mounted on the lower end of bolt 49 between the lower end of the barrel 30 and the nut 51. The rear ends of the bars 52, 53 are peripherally threaded as at 58. Positioned on the bars 52, 53 is a resilient cushioning or take-up element 59 of skeleton form. Mounted on the threaded ends of the bars 52, 53 are retaining nuts 60, 61 respectively. The element 59 is interposed between the outer side edge of an end post and the nuts 60, 61. The bar 52 extends through the upper end of the element 59. The bar 53 extends through the lower end of the element 59.

The end posts 12, 13 are provided with channels 62, 63 respectively. The channels 62, 63 are arranged between the channels 54, 55 and the end posts. The channels 54, 55, 62, 63 open at the inner side edge and at the outer side edge of the end posts. Associated with the end posts 12, 13 is a pair of adjustable oppositely disposed stay or anchoring elements 64, 65 respectively which are of like form and each includes an upper section 66 formed of an upper horizontally disposed stretch 67 and a downwardly extended, outwardly inclined stretch 68. The stretches 67 of the elements 64, 65 extend through the channels 62, 63 of the end posts 12, 13 respectively. The inner ends of the stretches 67 carry abutment nuts 69 which oppose the inner side edges of the end posts 12, 13. The elements 64 and 65 include a lower outwardly inclined section 70 which is adapted to be anchored in the ground. The sections 68, 70 of the elements 64, 65 are connected together by the adjustable turnbuckles 71. The stretches 67 of the elements 64, 65 extend through the element 59 centrally of these latter and said elements 59 are capable of being shifted upon said stretches 67.

With reference to Figure 7 the modified form of outer coupling device is substantially the same as the device 15 or 16 and is generally indicated at 72. The resilient skeleton element 73 employed in connection with the device 72 has its resilient parts 74 anchored together in pairs at their centers as at 75. Otherwise than that as stated, outer coupling device 72 would be similar in construction as outer coupling devices 15 or 16. With reference to Figure 7 the stay element indicated at 76 will be of the same form and construction as the stay element 64, 65 but the stay element 76 extends through a channel 77 formed in the end posts 78 above the outer coupling device 72.

With reference to Figures 8 and 9 the guard rail section 79 has its outer end of a different form than the guard rail sections 18 or 19. Figures 8 and 9 also illustrate an outer coupling device 80 of a different form than the outer coupling device 15, 16 and 72. The stay or anchoring element 81 shown in Figures 8 and 9 will be of the same arrangement with respect to the end posts 82 as the element 76 is disclosed in relation to the end post 78. The guard rail section 79 has secured to its rear face a rearwardly opening channel-shaped member 83 having its sides formed with aligning, superposed openings 84. The member 83 is flush with the outer end edge of rail section 79. Holdfast devices 85 are employed for anchoring the member 83 to the guard rail section 79. The end post 82 is not only provided near its upper end with a channel 86 for the upper stretch of the stay element 81 but it is also provided below the channel 86 with aligning spaced channels 87, 88 and 89 which extend from the outer side edge to the inner side edge of the post 82. The coupling device 80 includes superposed parallel take-up rods 90, 91 and 92 which extend through channels 87, 88 and 89 and also through the registering openings 84 in the sides of the channel member 83. The inner ends of the rods 90, 91 and 92 carry abutment nuts 93 which abut the inner side 94 of the member 83. The rods 90, 91 and 92 project outwardly from the outer side edge of the post 82 and are provided with abutment nuts 95 on their outer ends. Interposed between the nuts 95 and the outer side edge of the post 82 as well as being mounted on the rods 90, 91 and 92 is a resilient cushioning or take-up element 96 of skeleton form. The rod 90 extends through the upper end of the element 96. The rod 91 extends through the center of the element 96 and the rod 92 extends through the lower end of the element 96.

With reference to Figure 10, it discloses a modified form of guard rail section 97 and a modified form of outer coupling device 98. The latter includes superposed bars 99, 100 and 101 which are slidably mounted in the end post 102. The device 98 includes a resilient element 103 mounted on the said bars. The guard rail section 97 has its barrel 104 cut out as at 104a. The bar 100 extends into the cutout 104a. The bars 99, 100 and 101 are connected to the pivot bolt 104b. Otherwise than that as stated, the construction as shown in Figure 10 is the same as that shown in Figure 7.

With reference to Figure 11, it discloses a modified form of a resilient take-up and cushioning element 105 which is of the same construction as the element 59 with this exception that the resilient parts 106 of element 105 are oppositely disposed with respect to the resilient parts of the element 59.

Figures 12 and 13 illustrate the manner in which the end terminal portions of each of the resilient parts, straps or members of the resilient elements of the coupling devices are set up.

In Figure 12 the end terminal portions 107 are shown as being formed with oppositely disposed notches 108 opening at their outer edges, and in Figure 13 the end terminal portions 109 as shown and being formed with slots 110 lengthwise thereof. The notches 107 and slots 110 are of the desired length to provide for the extensions of the said resilient parts, straps or members when the resilient elements are compressed.

Each cushioning or take-up device other than those shown in Figures 16 and 17 includes a set of resilient members of strap-like form arranged between the extenders. Each resilient member consists of a straight upper end terminal portion, a straight lower end terminal portion and a truncated V-shaped intermediate portion which is offset laterally with respect to the inner ends of said upper and lower end terminal portions. The end terminal portions of the members of said set are in contacting relation. The intermediate portions of the resilient members of the set are in contacting relation and the contact is arranged in a plane parallel to the point of contacting relation between the end terminal portions of said members. With reference to Figures 16 and 17 the intermediate portion of each of the resilient members shown in these figures is of semi-circular contour instead of truncated V-shaped contour. Otherwise than that as stated, the form of the members shown in Figures 16 and 17 will be the same as the forms of resilient members shown in the other figures of the drawings. The intermediate portion of each resilient member is of greater length than either one of the end terminal portions thereof. Each of the resilient members is capable of being extended and contracted endwise. The extenders or abutments at the ends of each set of resilient members coact with the intermediate portions of said members for extending the latter to set up a cushioning action.

In those forms of the tensioning device as shown, which include two pairs of shifting bars, which correspond to the bars 32, 33 37, 38 of Figure 2, a bar of each pair will extend through an end terminal portion of each of the resilient members of a set. A pair of shifting bars when moved in one direction will coact with the extenders and intermediate portions of the resilient members for extending the length of the members to provide a cushioning action. When one pair of shifting bars moves in one direction, the other pair will coact therewith to provide the function aforesaid. When the two pairs of shifting bars move in opposite directions in unison the same function as aforesaid will be obtained.

The outer coupling devices may have the end terminal portions of the inner resilient part, strap or member of the resilient element thereof bear against washers 111 carried by the bars 52, 53 as shown in Figure 4 or they may abut or bear against an inner strap 112 carried by the bars 90, 91, 92 as shown in Figure 8.

The resilient element of each outer coupling device referred to is outwardly adjacent the outer side edge of an end post. The latter, or the washers 111 or the strap 112 provides an abutment for the resilient element of the outer coupling. Each outer coupling device includes a slidable compressing member for its resilient element. The said compressing member is in the form of an outer strap 113 mounted on the bars of the outer coupling element against the nuts on the outer end of said bars. When these latter move inwardly, that is, in a direction towards an end post, the strap 113, due to the nuts on the outer ends of the bars, will be carried with the bars and compress the resilient element thereby providing a cushioning take-up and shock absorbing function for the guard rail.

With reference to Figures 14 and 15, the guard rail sections are designated 114, 115 and have their inner ends formed with rearwardly directed flanges 116, 117 respectively. The outer ends, only one shown, of the sections 114, 115 have secured to their inner faces rearwardly opening channel members 118 extending from the upper to the lower lengthwise edge and flush with the outer edge of the sections. The sections 118, 119 are coupled together in spaced relation by a take-up element 120 consisting of a pair of resilient units 121, 122, a pair of superposed bars 123 provided at their ends with nuts 124 and a pair of compressing members 125, 126. The unit 121, as well as the unit 122, is formed of a pair of oppositely off center secured together resilient parts notched or slotted in the manner as shown in Figures 12 and 13, respectively. The flanges 116, 117 are formed with aligning superposed openings 119 for the passage of the bars 123. These latter also extend through and support the units 121, 122 and members 125, 126. The unit 121 is arranged between the flange 116 and member 125. The unit 122 is arranged between the flange 117 and the member 126. A suspension element 127 for the section 114 is carried by a post 128.

Slidably connected to the member 118 is a cushioning device 129 formed of a pair of superposed bars 130 having their ends provided with nuts 131. The bars 130 extend through the sides of member 130 and have mounted on their inner ends adjacent the nuts 131 on said ends a compressing member 132. Positioned on and supported by the bars 130 is a pair of abutting resilient units 133, 134 of the same form as a unit 121 or 122. The unit 133 abuts the inner side of member 118. The unit 134 abuts the member 132. The bars 130 extend through an end post 135 and the nuts 131 on the outer end of the bars 130 abut post 135.

With reference to Figures 16 and 17, the guard rail is to be formed of a pair of spaced intermediate sections and a pair of end sections, but one end section is shown and that end section not shown will be of the same construction as the end section which is shown. The end section not shown will be provided with a cushioning device of the same construction as that shown in connection with that end section of the guard rail which is illustrated. A portion of one of the intermediate sections is shown, but that intermediate section which is not completely shown will be provided with a take-up device similar to that shown in connection with that end section and intermediate section which are completely illustrated. That end section which is completely shown is indicated at 136. That intermediate section which is completely shown is indicated at 137 and that intermediate section which is not completely shown is indicated at 138. Each intermediate section will be provided at its ends with rearwardly extending flanges as shown in connection with section 137 and such flanges, with reference to section 137, are indicated at 139 and 140. The section 138 which is not completely shown, but conforms in construction to section 137, is illustrated as having its inner end provided with a rearwardly extending flange 141 which opposes the flange 140. The sections 137, 138 are connected together by a resilient take-up device 142 formed of a set of three superposed bars 143 having their ends provided with combined connecting and abutment nuts 144. The flanges 140, 141 are provided with superposed openings for the passage of the bars 143. Mounted on the bars 143 and abutting the nuts at each end of said bars are the compressing members 145, 146. Positioned on the bars 143 and interposed between the flange 140 and member 105 is a resilient unit 147. Mounted on the bars 143 and interposed between the flange 141 and member 146 is a resilient unit 148. Each resilient unit is formed from a resilient strap having a bow-shaped intermediate portion. The resilient units 147, 148 are oppositely disposed. The bow-shaped portion of the unit 147 abuts the flange 140. The bow-shaped portion of unit 148 abuts flange 141. Each end section of the guard rail is adapted to be connected in spaced relation to one of the intermediate sections by a take-up device and this structural arrangement is shown in relation to sections 136 and 137. The take-up device for connecting the section 136 to 137 is indicated at 149 and it consists of a pair of superposed bars 150, combined securing and abutment nuts 151 on the ends of said bars, compressing members 152, 153 mounted on the bars against the nuts on the ends of said bars and a pair of oppositely disposed resilient units 154, 155 which are also mounted on the bars 150. The unit 154 is disposed between the member 152 and a rearwardly directed flange 156 on the inner end of the section 136. Flanges 139 and 156 are provided with openings for the passage of the bars 150. The unit 155 is interposed between the member 153 and the flange 139 on section 137. Each end section of the guard rail is adapted to be connected with an end post 157 by a combined coupling and cushioning device which is slidably connected to the outer end of said section and this arrangement is illustrated with respect to section 136. The section 136 is formed at its outer end with a channel-shaped member 158 which opens rearwardly and extends from the top to the bottom edge and is flush with the outer end edge of section 136. Carried by the member 158 is a combined coupling and cushioning device or element 159 consisting of a pair of superposed bars 160 which extend through the post 157 and also through the sides of the member 158. The inner and outer ends of the bars 160 are provided with combined securing and abutment nuts 161. Positioned on the bars 160 and arranged adjacent the nuts 161 on the inner ends of said bars is a compressing member 162. Interposed between the inner side of the member 158 and the member 162 is a resilient unit 163 which is fixedly secured by the holdfast means 164 to the member 162. The unit 163 consists of a strap formed of a bow-shaped intermediate portion.

The units 147, 148, 154, 155 and 163 are substantially of the same form and said units are to be provided with notches or slots such as shown in Figures 12 and 13. The nuts 161, at the outer end of the bars 160, abut post 157.

With reference to Figure 18, the guard rail includes a pair of sections 165, 166. The section 166 is not completely shown but it will be constructed in the same manner as the section 165. The inner ends of the sections 165, 166 are provided with rearwardly directed flanges 167, 168 respectively. The sections 165, 166 are connected together in spaced relation by a take-up device 169 consisting of a set of three superposed bars 170 having their ends provided with combined abutment and securing nuts 171. The flanges 167, 168 are provided with openings for the passage of the bars 170. Positioned on the bars 170, against the nuts 171 at one end of said bars, is a compressing member 172 and positioned on the bars 170 and abutting the nuts 171 at the other ends of said bars is a compressing member 173. Mounted on the bars 170 and interposed between the member 172 and flange 167 is a resilient unit 174 formed of a pair of oppositely disposed like parts. Positioned on the bars 170 between the flange 168 and the member 173 is a resilient unit 175 formed of a pair of oppositely disposed like parts. The units 124, 125 are of the same construction. The parts of the units 174, 175 are to be provided with notches or slots in a manner as shown in Figures 12 and 13. The outer end of the section 165 is provided with a rearwardly extending flange 176. The section 165 is connected to an end post 177 by a combined coupling and cushioning device consisting of a set of three superposed bars 178 having their ends provided with combined abutment and securing nuts 179. The nuts 179, at the outer end of the bars 178, abut the post 177. Mounted on the bars 178 and abutting the nuts 179 on the inner ends of the bars 178, is a compressing member 180. The flange 176 is provided with openings for the passage of bars 178 and mounted on the bars 178 between the flange 176 and the compressing member 180 is a resilient unit 181 of the same form as the units 174, 175.

The guard rail heretofore referred to has its sections formed of a stretch or stretches of platelike material and it is to be understood that when reference is made to a section of the guard rail that such section may be formed of two or more parts. With reference to Figure 19, the guard rail is formed of two sections consisting of a pair of parts in the form of cables and it is to be understood that when reference is made to a guard rail section that the word "section" is to cover a section formed of sheet metal or cables. With reference to Figure 19, it discloses a guard rail formed of a pair of sections 182, 183 and with the former consisting of a pair of superposed cables 184, 185 and with the latter being formed of a pair of superposed cables 186, 187 arranged, respectively, above and below cables 184, 185.

Each guard rail section includes a pair of superposed eye bolts. The eye bolts of the section 182 are indicated at 186, 187 and have their eyes connected respectively to the inner ends of the cables 184, 185. The eye bolts of the section 183 are indicated at 188, 189 and have their eyes connected to the inner ends of the cables 186, 187. The eye bolts 186, 187 extend in an opposite direction with respect to the eye bolts 188, 189. The eye bolt 188 is arranged over and spaced above the eye bolt 186. The eye bolt 187 is arranged over and spaced above the eye bolt 189. The eye bolts 187, 186 not only form continuations of the cables 184, 185 but also constitute supports forming elements of a resilient take-up device 190. The eye bolts 188, 189 not only form continuations of the cables 186, 187 respectively but also constitute supports forming elements of the take-up device 190. The take-up device 190 includes a resilient element 191 formed of a series of straps offset centrally and abutting. The element 191 is mounted on the several eye bolts. The take-up device 190 also includes a pair of compressing members 192, 193 which are also mounted on the eye bolts and are positioned against the ends of the unit 190. The inner ends of the eye bolts 186, 187 are provided with combined abutment and securing nuts 194 which are positioned against the outer side of the member 193. The ends of the eye bolts 188, 189, adjacent the ends thereof provided with the eyes, carry combined abutment and securing nuts 195 which are positioned against the outer side of the member 192. The straps of the element 191 are formed with notches or slots in a manner as shown in Figures 12 and 13.

The outer end of the rail section 183 is constructed in the same manner as shown with respect to the rail section 182. There is connected to the outer end of each rail section a combined coupling and cushioning element or device consisting of a pair of superposed eye bolts 196, 197 having their eyes 198 at the inner ends thereof and to the eyes 196, 197 are anchored the outer end terminal portions of the cables 184, 185. The eye bolts 196, 197 extend through and project outwardly from an end post 199. The outer ends of the bolts 196, 197 are provided with combined abutment and securing nuts 200. Positioned on the bolts 196, 197 and abutting the nuts 200 is a compressing member 201. Positioned on the bolts 196 and 197 and bearing against the posts 199 are washers 202. Interposed between the washers 202 and the member 201 is a resilient element 203 of the same construction as the element 190.

With reference to Figure 20, a modified form of resilient strap which is employed with the resilient elements is shown. The strap is generally indicated at 204 and includes a V-shaped portion 205 and a pair of end portions 206 which merge into and are disposed at right angles to the portion 205. When the strap 204 is used to set up a resilient element a pair of straps is employed and which are oppositely disposed and have interposed therebetween a washer 207. A pair of straps and washer 207 are connected together by the holdfast device 208.

With reference to Figure 21, a modified form of suspension element is shown and which is indicated generally at 209. The element 209 is of the same form as the element 16a with the exception that the oppositely disposed bands 210 of element 209 are connected together by the holdfast means 211.

The take-up devices between the sections of the guard rail will be termed "resilient intermediate coupling devices" and the combined coupling and cushioning devices or elements will be termed "slidably suspended resilient outer coupling devices."

What I claim is:

1. In a tensioning device, a set of parallel sidewise aligned resilient members of strap-like form capable of being extended and contracted lengthwise in unison, each of said members including a pair of inner endwise aligned end terminal portions and an intermediate portion offset laterally with respect to the inner ends of the said end terminal portions, the said end terminal portions of said members being arranged in contacting relation, the said intermediate portion of said members being arranged in contacting relation in a plane parallel to said end terminal portions, spaced parallel sidewise aligned slidable extenders for said members, an inner and an outer pair of oppositely shiftable elements for said extenders, the elements of said pairs being disposed in parallel spaced lengthwise relation, said elements coacting with said extenders and with the said intermediate portions, when a pair of said elements is shifted in one direction for extending said members lengthwise to provide a cushioning action, one of said elements of each pair of elements extending through an end terminal portion of each of said members, said elements slidably suspending said members and extenders, and the said end terminal portions of said members being so formed to provide, when said members are extended lengthwise, for the members to move transversely of said elements.

2. In a tensioning device, vertically disposed lengthwise extendible resilient members arranged in contacting relation in spaced parallel planes, spaced parallel extenders for said elements, an outer pair of shifting elements for one of said extenders, an inner pair of shifting elements for the other of said extenders, said outer pair of shifting elements extending through the end terminal portions of said members, said inner pair of shifting elements extending through the end terminal portions of said members, the elements of one pair carrying abutment means bearing against the outer face of one of said extenders, the elements of the other pair carrying abutment means bearing against the outer face of the other of said extenders, said elements when shifted coacting with said extenders and extending said members lengthwise, and the said end terminal portions of said members being so formed to provide when said members are extended to shift transversely of said elements.

3. In a tensioning device, a set of upstanding resilient members formed with upper and lower end terminal portions and intermediate portions offset with respect to said end terminal portions, said intermediate portions being arranged in contacting relation, said end terminal portions being arranged in contacting relation in planes parallel to the points of contacting relation of said intermediate portions, and pressure applying means coacting with said intermediate portions for extending said members lengthwise, said means including a pair of spaced oppositely disposed upper parts extending through said upper terminal end portions, said means including a pair of spaced oppositely disposed lower parts extending through said lower end terminal portions, said members having their upper and lower end terminal portions being so formed to provide for said members moving transversely of said parts when said members are lengthwise extended.

4. In a tensioning device, a set of lengthwise extendible resilient members of continuous strap-like form sidewise contacting at the opposite end terminal portions thereof and sidewise contacting intermediate their ends in a plane parallel to the plane of said end terminal portions, abutment means bearing against the ends of said set, and pressure applying means coacting with said abutment means for extending said members lengthwise, said pressure applying means including a pair of continuous spaced parallel simultaneously shiftable inner parts extending through the end terminal portions of said members and said pair of abutment means and bearing against the outer face of one of the abutment means, and said pressure applying means including a pair of continuous spaced parallel simultaneously shiftable outer parts extending through the end terminal portions of said members and said pair of abutment means and bearing against the outer face of the other of said abutment means.

5. In a tensioning device, a set of lengthwise extendible resilient members of continuous strap-like form sidewise contacting at the opposite end terminal portions thereof and sidewise contacting intermediate their ends in a plane parallel to the plane of said end terminal portions, abutment means bearing against the ends of said set, and pressure applying means coacting with said abutment means for extending said members lengthwise, said pressure applying means including a pair of continuous spaced parallel simultaneously shiftable inner parts extending through the end terminal portions of said members and said pair of abutment means and bearing against the outer face of one of the abutment means, and said pressure applying means including a pair of continuous spaced parallel simultaneously shiftable outer parts extending through the end terminal portions of said members and said pair of abutment means and bearing against the outer face of the other of said abutment means, and each end terminal portion of each member being so formed to provide for such member during the extending thereof to move transversely of said parts.

6. In a tensioning device, lengthwise extendible and contractable resilient members of continuous strap-like form arranged in sidewise relation, the end terminal portions of said members being disposed in permanent contacting relation, said members being disposed in permanent contacting relation intermediate their ends in planes parallel to the planes of said end terminal portions, and a pressure applying structure for extending said members lengthwise to provide a cushioning function, said structure including a pair of superposed shiftable continuous inner parts slidably extending through the end terminal portions of the said members and a pair of superposed shiftable continuous outer parts slidably extending through the said end terminal portions of said members, the said inner and outer parts suspending said members, said inner parts being shiftable simultaneously and said outer parts being shiftable simultaneously.

7. In a tensioning device, lengthwise extendible and contractable resilient members of continuous strap-like form arranged in sidewise relation, the end terminal portions of said members being disposed in permanent contacting relation, said members being disposed in permanent contacting relation intermediate their ends in planes parallel to the planes of said end terminal portions, and a pressure applying structure for extending said members lengthwise to provide a cushioning function, said structure including a pair of superposed shiftable continuous inner and outer parts slidably extending through the said end terminal portions of said members, the said inner and outer parts suspending said members, said inner parts being shiftable simultaneously and said outer parts being shiftable simultaneously, and each end terminal portion of each of said members being formed with means to provide for said members shifting transversely of said inner and outer parts when said members are extended and contracted.

8. In a tensioning device, a set of parallel sidewise aligned resilient members of strap-like form capable of being extended lengthwise in unison, each of said members including a pair of slotted aligned end terminal portions and an intermediate portion offset laterally with respect to the inner ends of the said end terminal portions, the said end terminal portions each having contact faces, the said intermediate portions each having a contact face, a pair of abutments, each arranged at an end of the set and one being movable towards and away from the other, shiftable means extending through the slots of said terminal portions of said members and through said abutments, coacting with an abutment for extending said members lengthwise on the shifting of the said shiftable means, said means suspending and maintaining said members in parallel alignment with respect to each other.

9. In a tensioning device, a set of sidewise aligned independent elongated bent resilient members, said members being formed with slotted end terminal portions and being so related to provide for the lengthwise extending thereof in unison on application of pressure thereto, a pair of abutments, arranged one at each side of the set and one movable towards the other for applying pressure to said members, shiftable means extending through the slots of said end terminal portions, through said abutments and coacting with an abutment for applying pressure to said members, said means also suspending and maintaining said members in parallel alignment with respect to each other.

10. In a tensioning device, a set of sidewise aligned independent elongated bent resilient members, said members being formed with slotted end terminal portions and being so related to provide for the lengthwise extending thereof in unison on application of pressure thereto, a pair of abutments, arranged one at each side of the set and one movable towards the other for applying pressure to said members, shiftable means extending through the slots of said end terminal portions, through said abutments and coacting with an abutment for applying pressure to said members, said means also suspending and maintaining said members in parallel alignment with respect to each other, said members being in contact with each other intermediate their ends, the end terminal portions of the inner members of said set being in contact, and the end terminal portions of the outer members of said set being in contact with said abutments.

11. In a tensioning device a set of parallel endwise aligned normally contracted resilient members capable of being extended lengthwise, the members of said set being arranged in pairs, the members of each pair being oppositely disposed, each member being formed of an intermediate portion and a pair of end terminal portions, said intermediate portions being offset laterally relative to said end terminal portions, the members of said set being arranged in contacting relation, the end terminal portions of said members being slotted, a pair of abutments, said set being arranged between said abutments, one of said abutments movable towards and from the other, a shiftable means extending through the slots at one end of said members and through said abutments, and a shiftable means extending through the slots at the other end of said members and through said abutments, said pair of shiftable means suspending said members and providing when shifted in unison in one direction for extending said members lengthwise transversely of said means.

12. In a tensioning device a set of parallel endwise aligned normally contracted resilient members capable of being extended lengthwise, the members of said set being arranged in pairs, the members of each pair being oppositely disposed, each member being formed of an intermediate portion and a pair of end terminal portions, said intermediate portions being offset laterally relative to said end terminal portions, the members of said set being arranged in contacting relation, the end terminal portions of said members being slotted, a pair of abutments, said set being arranged between said abutments, one of said abutments movable towards and from the other, a shiftable means extending through the slots at one end of said members and through said abutments, and a shiftable means extending through the slots at the other end of said members and through said abutments, said pair of shiftable means suspending said members and providing when shifted in unison in one direction for extending said members lengthwise transversely of said means, the contacting relation between said members being at intermediate and end terminal portions.

13. In a tensioning device a plurality of lengthwise extendible sidewise aligned resilient members, each formed of a pair of end terminal portions and an intermediate portion offset with respect to said terminal portions, said intermediate portions being in contacting relation at the centers thereof, said end terminal portions being slotted, and a combined suspension and pressure applying structure for said members, said structure including parallel shiftable parts extending through the slots of said end terminal portions and a shiftable means abutting one of said members, said shiftable parts and shiftable means when moving in unison in a like direction applying pressure to said members for extending them lengthwise transversely of said shiftable parts.

JOHN P. DENNEBAUM.